US006198775B1

United States Patent
Khayrallah et al.

(10) Patent No.: US 6,198,775 B1
(45) Date of Patent: Mar. 6, 2001

(54) TRANSMIT DIVERSITY METHOD, SYSTEMS, AND TERMINALS USING SCRAMBLE CODING

(75) Inventors: Ali S. Khayrallah, Apex; Kambiz C. Zangi, Raleigh; Rajaram Ramesh, Cary, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/067,602

(22) Filed: Apr. 28, 1998

(51) Int. Cl.[7] .................................................. H04L 23/02
(52) U.S. Cl. .......................... 375/265; 375/267; 375/299; 714/755
(58) Field of Search ........................ 375/260, 265, 375/267, 295, 299, 316, 343, 349; 455/91, 103, 132, 277.1, 101, 272, 504; 714/755, 756, 757, 767, 772

(56) References Cited

U.S. PATENT DOCUMENTS

| | | | |
|---|---|---|---|
| 5,442,626 | * 8/1995 | Wei | 5/28 |
| 5,479,448 | * 12/1995 | Seshadri | 375/267 |
| 5,623,485 | * 4/1997 | Bi | 370/209 |
| 5,721,745 | * 2/1998 | Hladik et al. | 714/755 |
| 5,729,560 | * 3/1998 | Hagenauer et al. | 714/786 |
| 5,790,570 | * 8/1998 | Heegard et al. | 714/755 |
| 5,832,044 | * 10/1998 | Sousa et al. | 375/347 |
| 5,859,879 | * 1/1999 | Bolgiano et al. | 375/347 |
| 5,878,085 | * 3/1999 | McCallister et al. | 375/280 |
| 5,930,230 | * 7/1999 | Odenwalder et al. | 370/208 |
| 5,946,328 | * 8/1999 | Cox et al. | 714/784 |
| 6,023,783 | * 2/2000 | Divsalar et al. | 714/792 |
| 6,088,387 | * 7/2000 | Gelblum et al. | 375/222 |
| 6,097,764 | * 8/2000 | McCallister et al. | 375/298 |

FOREIGN PATENT DOCUMENTS

WO97/41670  11/1967 (WO) ............... H04L/23/02

OTHER PUBLICATIONS

Khayrallah, Ali S., Precoding for Convolutional Codes, *1996 IEEE Internaitional Conference on Communications (ICC), Converging Technologies for Tomorrow's Applications,* vol. 1, pp. 118–121 (Dallas, Jun. 23–27, 1996).

Seshadri, Nambi, et al., Advanced Techniques for Modulation, Error Correction, Channel Equalization, and Diversity, *AT&T Technical Journal,* vol. 72, No. 4, pp. 48–63 (Jul. 1, 1993).

International Search Report for PCT/US99/06872.

Jiann–Ching Guey et al., Signal Design For Transmitter Diversity Wireless Communication Systems Over Rayleigh Fading Channels; 1996 IEEE 46th Vehicular Technology Conference, Atlanta Georgia, USA, Apr. 28–May 1, 1996, pp. 136–140.

(List continued on next page.)

*Primary Examiner*—Chi Pham
*Assistant Examiner*—Emmanuel Bayard
(74) *Attorney, Agent, or Firm*—Myers Bigel Sibley & Sajovec

(57) ABSTRACT

A method of transmitting information includes the steps of mapping an information word to first and second code words using first and second mapping functions, and transmitting the first and second code words. The information word is selected from a set of information words with each of the information words in the information word set having a first predetermined length, and the first code word is selected from a set of code words with each of the code words in the code word set having a second predetermined length greater than the first predetermined length. The second code word is selected from the code word set, and the first and second mapping functions are defined such that each of the information words of the information word set are mapped to two different code words of the code word set. Related systems and terminals are also discussed.

50 Claims, 8 Drawing Sheets

OTHER PUBLICATIONS

R. Ramesh, Performance of Coded Modulation Schemes Using Multiple Transmit Antennas, 1997 IEEE, ISIT 1997, Ulm, Germany, Jun. 29–Jul. 4, 1997, p. 102.

V. Tarokh et al., Space–Time Codes For High Data Rate Wireless Communication: Mismatch Analysis, 1997 IEEE, pp. 309–313.

* cited by examiner

Plot of BER and FER for (8,8;1)
(uncoded) using 2TXS, 2TXR, and 2RX

Plot of BER and FER for (7,4;3)
code using 2TXS, 2TXR, and 2RX

Plot of BER and FER for (15,5;7) code using 2TXS, 2TXR, and 2RX

Plot of BER and FER for (15,7;5) code using 2TXS, 2TXR, and 2RX

Plot of BER and FER for (15,11;3)
code using 2TXS, 2TXR, and 2RX

Plot of BER and FER for (24,12;8) code using 2TXS, 2TXR, and 2RX

TRANSMIT DIVERSITY METHOD, SYSTEMS, AND TERMINALS USING SCRAMBLE CODING

FIELD OF THE INVENTION

The present invention relates to the field of communications an more particularly to diversity transmission systems and methods.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. More recently, digital cellular systems such as designated IS-54B and IS-136 in North America and the pan-European GSM system have been introduced. These systems, and others, are described, for example, in the book titled *Cellular Radio Systems* by Balston, et al., published by Artech House, Norwood, Mass., 1993.

Frequency reuse is commonly employed in cellular technology wherein groups of frequencies are allocated for use in regions of limited geographic coverage known as cells. Cells containing equivalent groups of frequencies are geographically separated to allow mobile units in different cells to simultaneously use the same frequency without interfering with each other. By so doing many thousands of subscribers may be served by a system of only several hundred frequencies.

In the United States, for example, Federal authorities have allocated to cellular communications a block of the UHF frequency spectrum further subdivided into pairs of narrow frequency bands called channels. Channel pairing results from the frequency duplex arrangement wherein the transmit and receive frequencies in each pair are offset by 45 MHz. At present there are 832, 30-KHz wide, radio channels allocated to cellular mobile communications in the United States. To address the capacity limitations of this analog system a digital transmission standard has been provided, designated IS-54B, wherein these frequency channels are further subdivided into time slots. The division of a frequency into a plurality of time slots wherein a channel is defined by a frequency and a time slot is known as time division multiple access (TDMA).

As illustrated in FIG. 1, a cellular communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of mobile stations and more than one MTSO. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two mobile stations 21 or, between a mobile station 21 and a landline telephone user 33. The function of the base station 23 is commonly to handle the radio communication with the mobile station 21. In this capacity, the base station 23 functions chiefly as a relay station for data and voice signals. The base station 23 also supervises the quality of the link 32 and monitors the received signal strength from the mobile station 21.

In a mobile communications system, signal performance my be reduced due to signal fading occurring as a result of physical interference and motion of the mobile user terminal. Fading can be reduced, for example, by increasing transmitter power, antenna size, and antenna height. These solutions, however, may be impractical and/or costly.

Accordingly, multiple transmit antennas have been used to provide transmission diversity as discussed for example in the reference by Guey et al. entitled "Signal Design for Transmission Diversity Wireless Communication Systems Over Rayleigh Fading Channels." (Proceedings IEEE VTC, 1996). The disclosure of this reference is hereby incorporated herein in its entirety by reference. If the antennas are placed far apart, each signal will experience independent fading. This diversity can be made accessible to the receiver by switching between the transmitters at different time instants. The peak to average power ratio of the transmitted signal may be greatly increased, however, and the output amplifier design may be complicated.

Other transmission diversity techniques that do not switch between transmitters are ones using an intentional time offset or frequency offset, phase sweeping, frequency hopping, and/or modulation diversity. Most of these techniques use phase or frequency modulation of each transmitter carrier to induce intentional time-varying fading at the receiver. In addition, coded modulation schemes have been proposed to access the diversity of a multiple transmitter system without using an interleaver.

Notwithstanding the transmission diversity techniques discussed above, there continues to exist a need in the art for improved diversity methods, systems, and terminals.

SUMMARY OF THE INVENTION

It is therefore an object of the present invention to provide improved communications methods, systems, and terminals.

It is another object of the present invention to provide methods, systems, and terminals having improved transmission and reception.

These and other objects are provided according to the present invention by methods and systems wherein an information word from an information word set is mapped to first and second code words and transmitted. More particularly, the information word is mapped using first and second mapping functions defined such that each of the information words of the information word set is mapped to two different code words thus providing scrambling transmission diversity. The two different code words can then be received and decoded jointly to provide an estimate of the information word.

The scrambling transmission diversity according to the present invention thus provides that all information words are scrambled into two distinct code words from the code word set. Enhanced transmission and reception are thus provided for all information words. By using scrambling transmission diversity according to the present invention in a communications system with mobile user terminals such as a cellular communications system, most of the additional functionality can be added at the base station transmitters. Accordingly, little additional functionality is required at the mobile terminals where size and power considerations may be more constraining.

A method according to the present invention provides that an information word is mapped to first and second code words using first and second mapping functions. In particular, the information word is selected from a set of information words with each of the information words in the information word set having a first predetermined length. Moreover, the first and second code words are selected from a code word set with each of the code words in the set having a second predetermined length greater than the first predetermined length. The first and second mapping functions are defined such that each of the information words of the information word set are mapped to two different code words of the code word set. The first and second code words are then transmitted.

More particularly, the first and second code words can be transmitted from first and second spaced apart antennas. The first and second code words can be transmitted concurrently over a common frequency. Accordingly, the first and second code words can be transmitted without impacting the transmission capacity.

The first mapping function can include a first generator matrix wherein the first code word is equal to the first generator matrix times the information word, and the second mapping function can include a second generator matrix so that the second code word is equal to the second generator matrix times the information word. The first and second generator matrices can be related by a precoder such that the first generator matrix is equal to the precoder times the second generator matrix. In addition, the precoder can be constructed from the outputs of a linear m-sequence generator.

More particularly, a number of information words in the information word set can be equal to a number of code words in the code word set. The information word can also be mapped to a third code word using a third mapping function wherein the third code word is selected from the code word set. Moreover, the first, second, and third mapping functions are defined such that each of the information words of the information word set are mapped to three different code words of the code word set, and wherein the transmitting step comprises transmitting the first, second, and third code words.

Methods and terminals are also provided for receiving information transmitted using code words as discussed above. In particular, the first and second code words are received and decoded to estimate the information word, and the first and second code words can be decoded simultaneously. Moreover, a first synchronization sequence can be transmitted with the first code word and a second synchronization sequence can be transmitted with the second code word, and the first and second code words can be transmitted over first and second paths. Accordingly, the fading of the first and second paths can be resolved using the first and second synchronization sequences.

The first and second code words can be transmitted concurrently and received concurrently, and the first and second code words can be transmitted over a common frequency. Moreover, the information word can be mapped to a third code word selected from the code word set, and the third code word can be transmitted. Accordingly, the receiving step can include receiving the first, second, and third code words, and the decoding step can include decoding the first, second, and third code words to estimate the information word.

The scrambling diversity methods, systems, and terminals of the present invention thus provide improved radio communications over fading communications channels. In particular, scrambling diversity transmission can be implemented at a base station of a mobile communications system such as a cellular communications system to provide improved communications. By adding most of the functionality at the base station, the improved communications can be provided without requiring significant additions to the mobile terminal where size and power considerations may be more constraining. Adding the functionality at the base station also has the advantage that there are typically fewer base stations than there are mobile terminals.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will full convey the scope of the invention to those skilled in the art. Like numbers refer to like elements throughout.

In a communications system according to the present invention, error control codes are used to provide transmission diversity. In a cellular communications system, transmission diversity can be used to transmit from a base station so that most of the additional functionality needed to support the transmission diversity can be added at the base station. Because the mobile user terminals may be more constrained in terms of physical size, and power supply, and because there are typically many more user terminals than base stations, there are advantages to reducing the additional functionality added at the user terminal.

Figure 2:
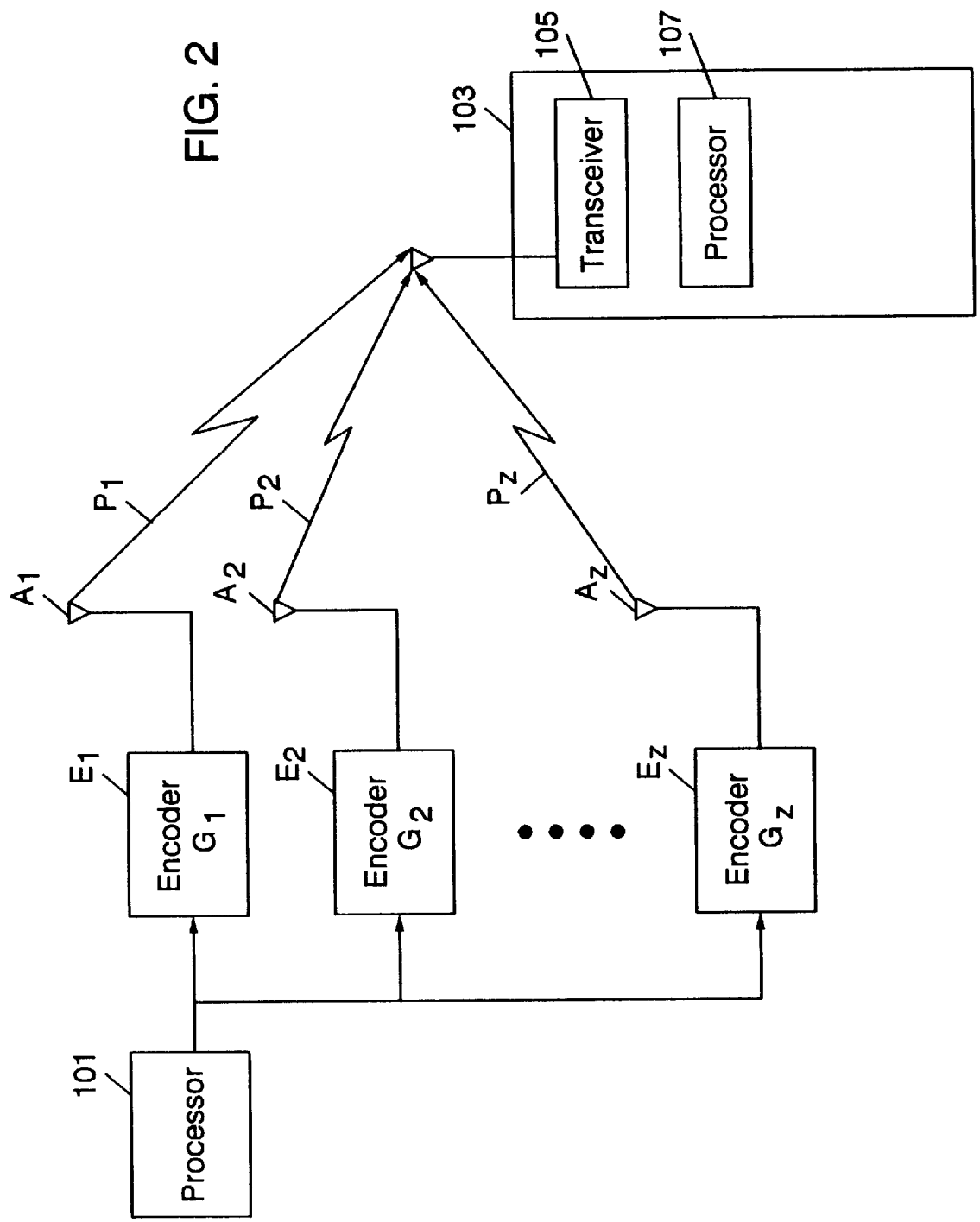
FIG. 2 is a block diagram of a diversity transmission system according to the present invention.
Figure 3:
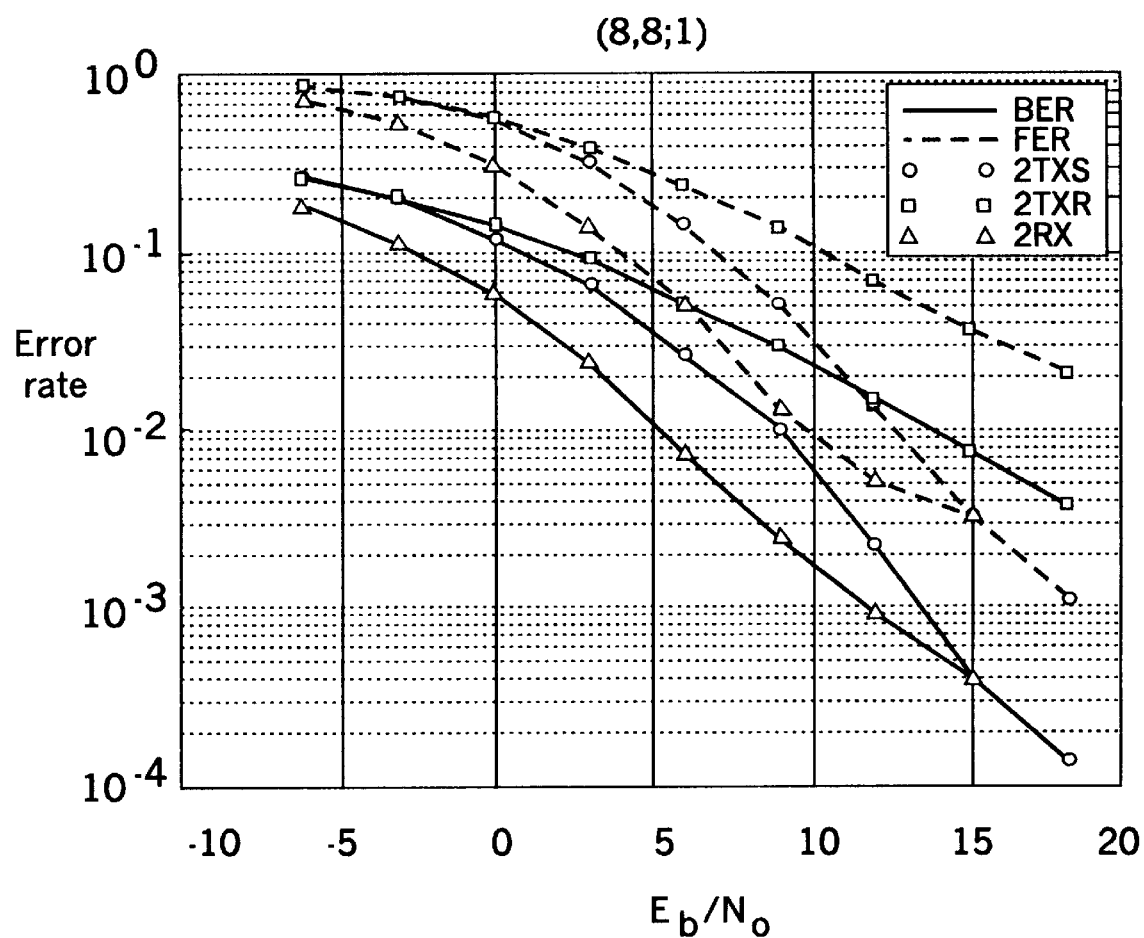
FIG. 3 is a graph illustrating the bit error rates (BERs) and frame error rates (FERs) for (8, 8; 1) (uncoded) transmissions using 2-antenna scrambling transmission diversity 2TXS, 2-antenna baseline repeat diversity 2TXR, and 2-antenna receive diversity 2RX.
Figure 4:
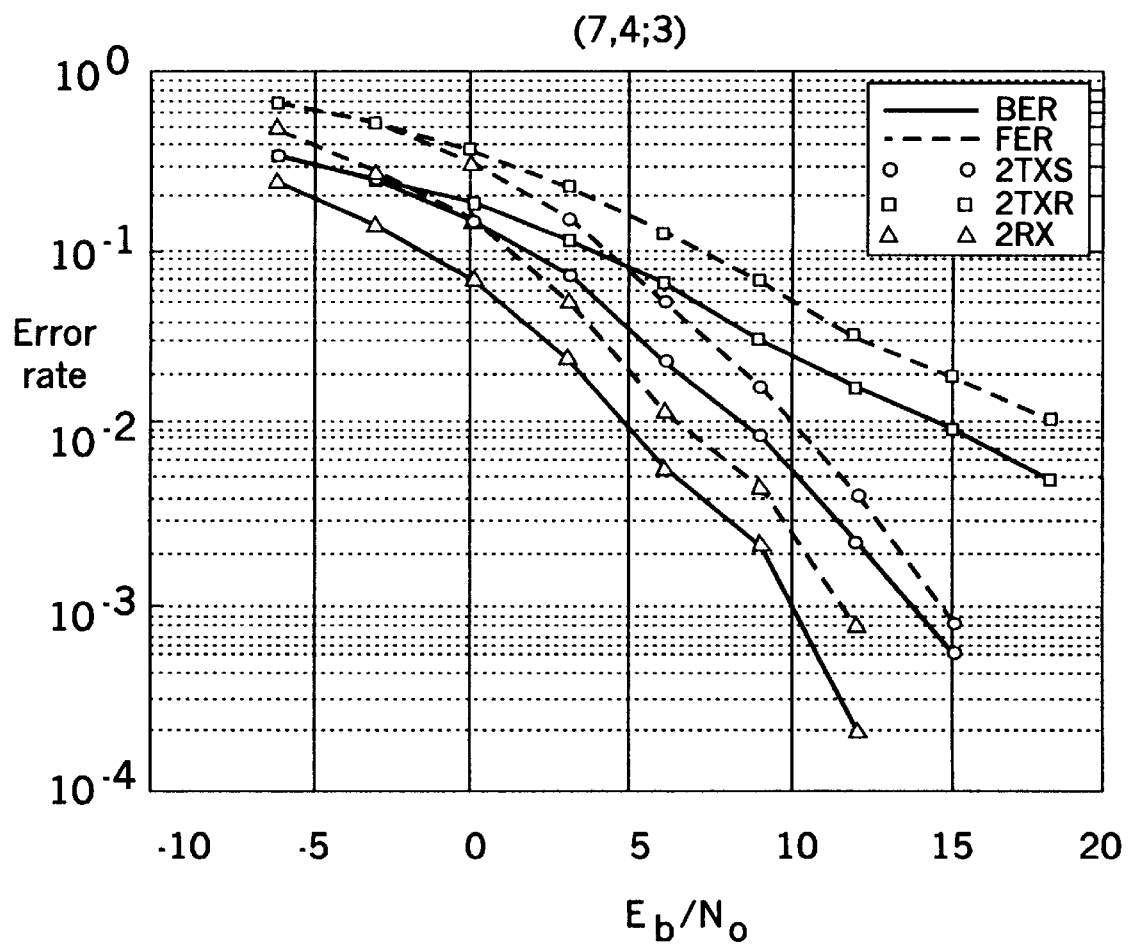
FIG. 4 is a graph illustrating the bit error rates (BERs) and frame error rates (FERs) for (7, 4; 3) transmissions using 2-antenna scrambling transmission diversity 2TXS, 2-antenna baseline repeat diversity 2TXR, and 2-antenna receive diversity 2RX.
Figure 5:
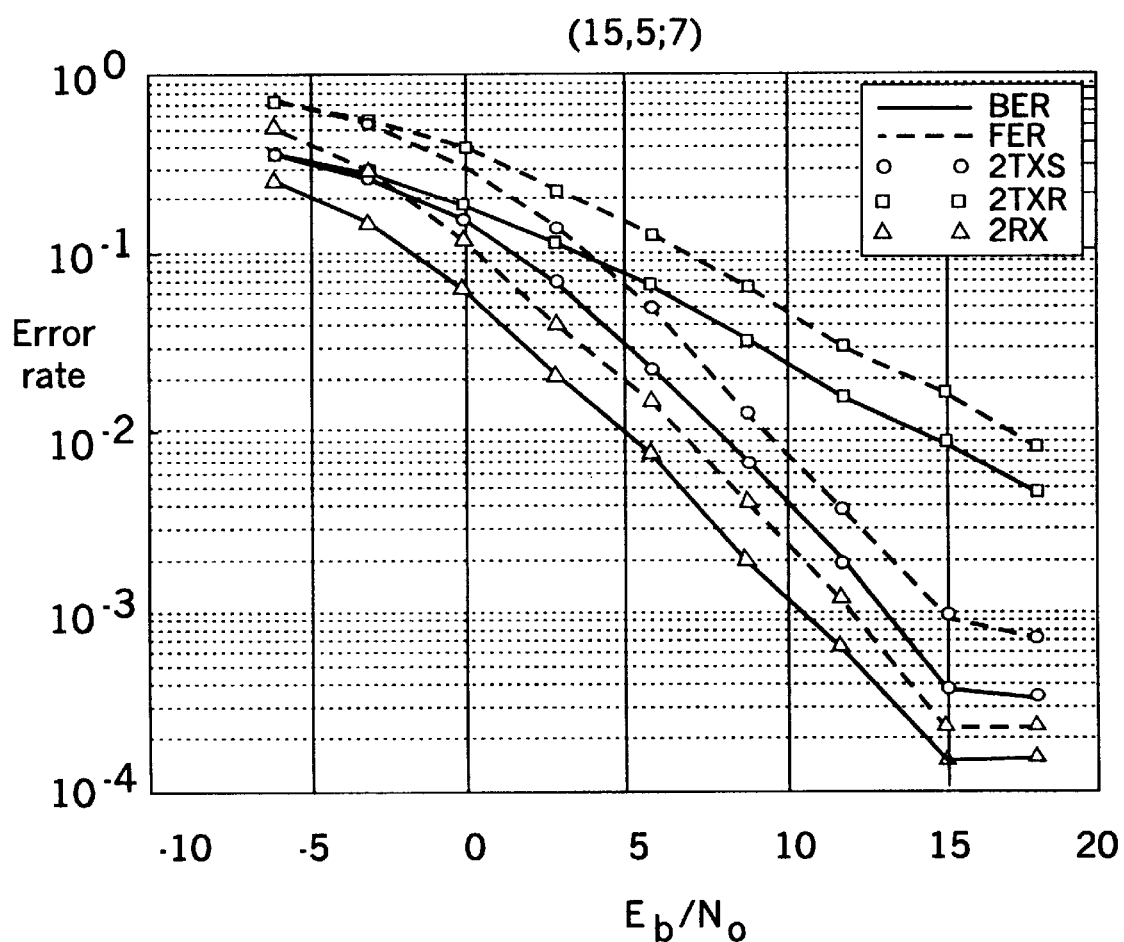
FIG. 5 is a graph illustrating the bit error rates (BERs) and frame error rates (FERs) for (15, 5; 7) transmissions using 2-antenna scrambling transmission diversity 2TXS, 2-antenna baseline repeat diversity 2TXR, and 2-antenna receive diversity 2RX.
Figure 6:
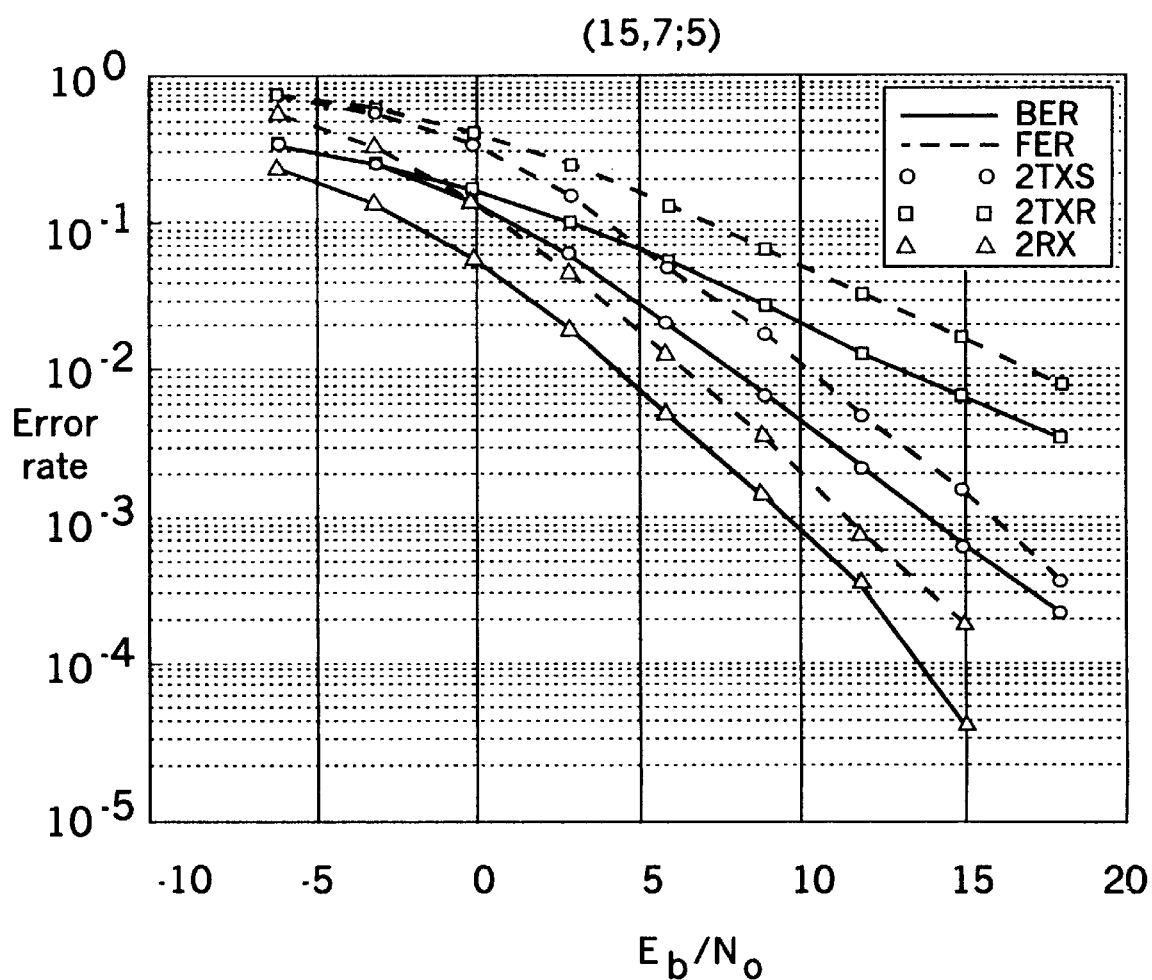
FIG. 6 is a graph illustrating the bit error rates (BERs) and frame error rates (FERs) for (15, 7; 5) transmissions using 2-antenna scrambling transmission diversity 2TXS, 2-antenna baseline repeat diversity 2TXR, and 2-antenna receive diversity 2RX.
Figure 7:
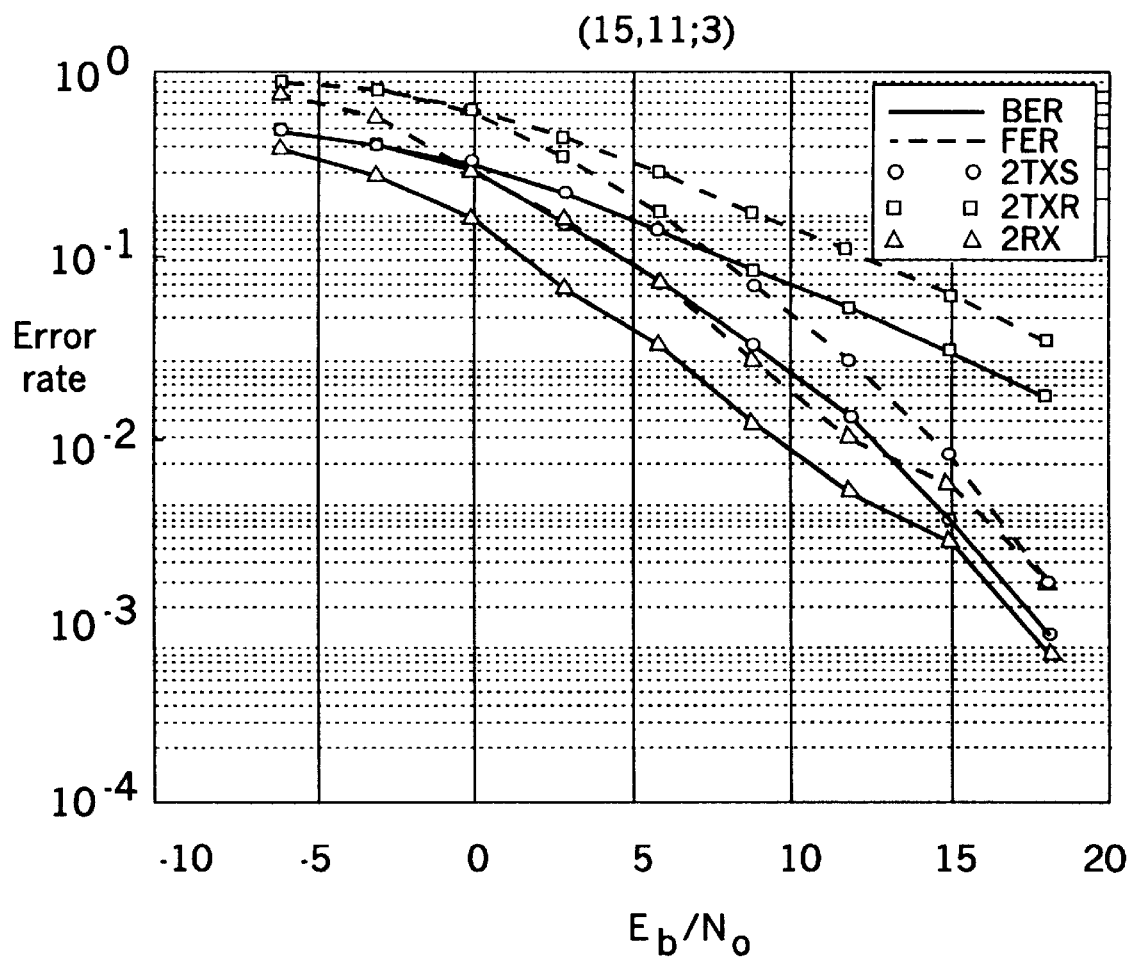
FIG. 7 is a graph illustrating the bit error rates (BERs) and frame error rates (FERs) for (15, 11; 3) transmissions using 2-antenna scrambling transmission diversity 2TXS, 2-antenna baseline repeat diversity 2TXR, and 2-antenna receive diversity 2RX.
Figure 8:
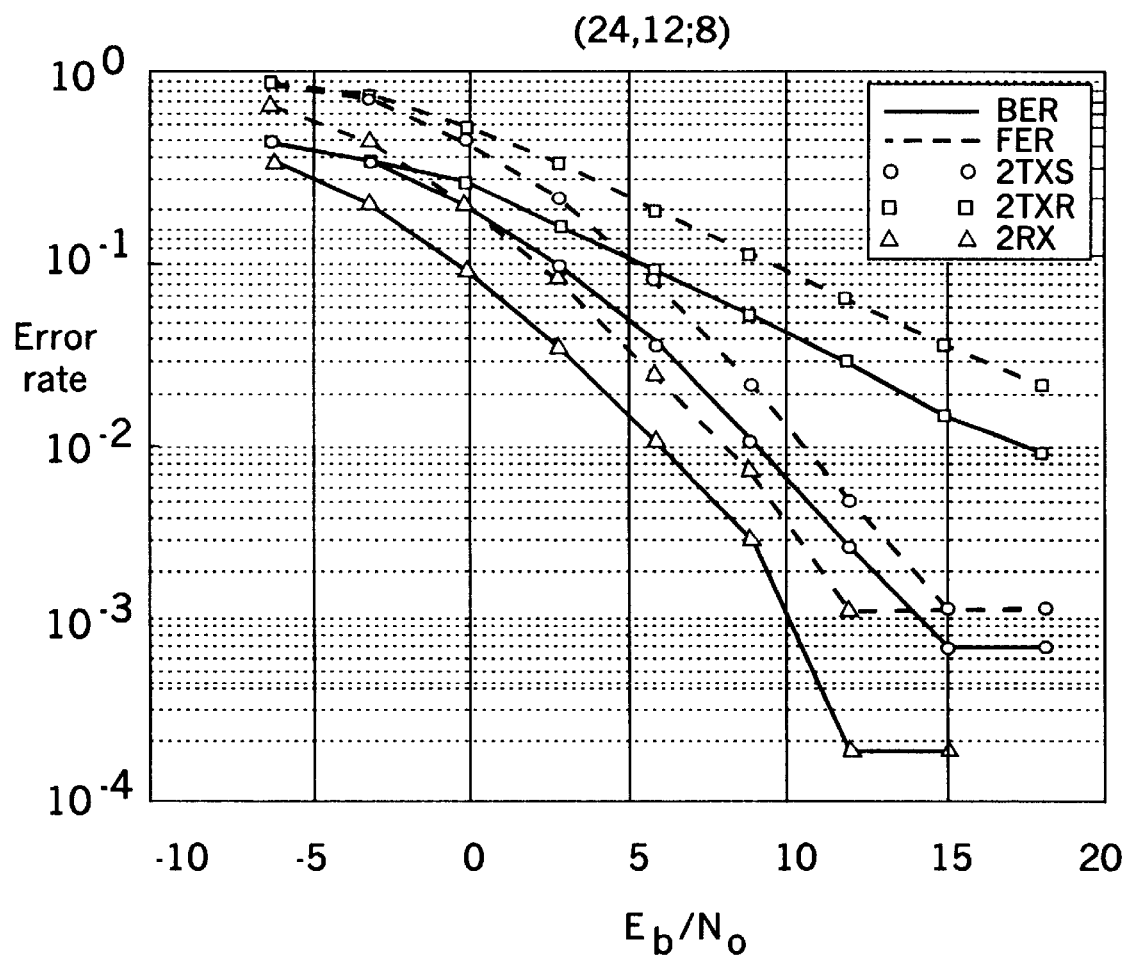
FIG. 8 is a graph illustrating the bit error rates (BERs) and frame error rates (FERs) for (24, 12; 8) transmissions using 2-antenna scrambling transmission diversity 2TXS, 2-antenna baseline repeat diversity 2TXR, and 2-antenna receive diversity 2RX.

Elements of a cellular communications base station and a user terminal according to the present invention are illustrated in FIG. 2. As shown, the base station includes a processor 101, a plurality of encoders $E_1$ to $E_Z$, and a respective plurality of antennas $A_1$ to $A_Z$. While up to "Z" encoders and antennas are shown, the invention can be implemented with two encoders and antennas. Each of the antennas $A_1$ to $A_Z$ transmits to the user terminal 103 over a respective transmission path $P_1$ to $P_Z$. As shown, the user terminal 103 includes a transceiver 105 and a processor 107. In general, the transceiver receives transmission from the base station antennas, and the processor processes the received transmissions. The user terminal can be a mobile radiotelephone, a personal computer, a personal digital assistant or any other electronic device adapted for communications with the base station.

In a digital communications system, the base station processor 101 generates information words to be transmitted to the mobile station. In particular, each of the information words is chosen from a set of information words wherein each of the information words in the set has a predetermined length. In other words, each of the information words has a predetermined number of bits k such that an information word can be represented as $\underline{x}=(x_1, x_2, \ldots x_k)$ and such that there are $2^k$ information words in the information word set.

An information word is provided by the processor 101 to each of the encoders. As shown, the base station can include up to "Z" encoders where $Z=2^k$ with k being the information word length. Diversity transmission according to the present can be achieved, however, using two encoders and antennas. Each encoder maps the received information word to a different code word chosen from a code word set wherein each code word in the set has a second predetermined length greater than the length of the information word. In other words, each of the code words has a predetermined number of bits n such that a code word can be represented as $\underline{y}=(y_1, y_2, \ldots y_n)$ wherein n is greater than k.

A plurality of different code words are then transmitted from respective antennas to the user terminal in response to a single information word. Because each code word is transmitted from a different antenna, each code word has a different path to the user terminal and will thus experience different fading characteristics. The code words are received at the user terminal transceiver 105 and provided to the user terminal processor 107 wherein the code words are decoded to provide an estimate of the original information word.

More particularly, each of the code words can be transmitted with a synchronization sequence unique to the encoder. Accordingly, each code word generated responsive to one information word is transmitted with a different synchronization sequence over a different path. The user terminal processor 107 can thus use the synchronization sequences to resolve the fading along each of the transmission paths and thereby determine which code word came from which encoder.

The code words corresponding to the information word provided to the encoders are transmitted concurrently from the respective antennas over a common frequency. Accordingly, the capacity of the system is not reduced as the duration of the transmission is not increased and the frequency use is not increased. In addition, the processor can simultaneously decode the code words to estimate the original information word.

Each of the encoders $E_1$ to $E_Z$ maps the information word to a different code word within the code word set based on a different generation matrix $G_1$ to $G_Z$. In other words, $\underline{y_1}=\underline{x}G_1$, $\underline{y_2}=\underline{x}G_2$, and $\underline{y_z}=\underline{x}G_z$. Moreover, the generator matrices are chosen such that the number of code words in the code word set is equal to the number of information words in the information word set, so that for each information word in the information word set, each generation matrix maps the information word to a different one of the code words. In other words, code words transmitted on different antennas are always distinct, and this property is referred to as scrambling diversity.

The mathematical properties and derivations of the transmit diversity generation matrices of the present invention will now be discussed in greater detail. In a two antenna diversity system, an (n, k; d) binary linear block code is defined where n is the code word length, k is the information word length, and d is the minimum Hamming distance, and each information word is provided to two encoders $E_1$ and $E_2$. The encoder $E_1$ maps the information to a first code word according the generator matrix $G_1$, and the encoder $E_2$ maps the information word to a second code word according to the generator matrix $G_2$, and the generator matrices $G_1$ and $G_2$ are distinct. An information word $\underline{x}$ is thus mapped to two code words:

$$y_1 = \underline{x}G_1,$$

and $$y_2 = \underline{x}G_2.$$

The code words $y_1$ and $y_2$ are then transmitted concurrently from respective antennas $A_1$ and $A_2$.

The generator matrices for the encoders are chosen so that two distinct code words are generated for each of the information words provided thereto. In other words, the generator matrices are preferably chosen to maintain the scrambling property as discussed below. The generator matrices can be related using a precoder F such that:

$$G_2 = FG_1.$$

Because useful generator matrices $G_1$ and $G_2$ are non singular, F is also non singular. The precoder F has the scrambling property if:

$$xF \neq x$$

when $$x \neq 0,$$

or equivalently if:

$$\underline{y_1} \neq \underline{y_2}$$

when $$x \neq 0.$$

The scrambling property provides that two distinct code words are generated for each information word. In other words, the code word pair will not collapse for any non-zero information word.

The precoder F which provides the scrambling property can be obtained by a search. Alternately, the precoder matrix can be constructed as discussed below. As will be understood by those having skill in the art, a linear circuit can be used to generate an m-sequence with m=k. This linear circuit includes a shift register wherein the contents of the shift register change at every clock cycle. In addition, if the shift register is initialized with a non-zero m-tuple, the register will cycle through all $2^m-1$ distinct non-zero m-tuples before coming back to the original value. The current register contents can thus be treated as the input, and the register contents during the following clock cycle can be the output. A scrambling matrix F can thus be generated having the form:

$$F = \begin{bmatrix} h_1 & h_1 & \ldots & h_m \\ 1 & 0 & \ldots & 0 \\ & \ddots & & \\ 0 & \ldots & 1 & 0 \end{bmatrix}$$

where $h_1$ to $h_m$ are the taps of the circuit.

This structure for the F matrix provides for up to $2^k$ generator matrices for $2^k$ encoders transmitting from $2^k$ antennas. For example, a first encoder can operate according to generator matrix $G_1$, a second encoder can operate according to generator matrix $G_2=FG_1$, a third encoder can operate according to generator matrix $G_3=F^2G_1$, and an ith encoder can operate according to generator matrix $G_i=F^{i-1}$ where $i \leq 2^k$.

Simulations indicate the transmission diversity techniques according to the present invention can be used for a (15, 5, 7) code at 1% bit error rate (BER) to provide two antenna transmit diversity with a 6.4 dB improvement in performance over no diversity, and only a 3 dB reduction in performance when compared with two antenna receive diversity.

Diversity transmission, reception, and decoding will now be discussed in greater detail for an (n, k; d) binary linear block code as discussed above. Again, a generator matrix G is used to map an information word $\underline{x}=(x_1, \ldots x_k)$ to a code word $\underline{y}=(y_1, \ldots y_n)$ such that $\underline{y}=\underline{x}G$ wherein the information word $\underline{x}$ and the code word $\underline{y}$ have binary components (0, 1). The Hamming weight of $\underline{y}$ is denoted $w(\underline{y})$. For convenience, a code word $\underline{y}$ can be treated as a bipolar vector (±1), which can be denoted Y, with components $Y_i=1-2\underline{y}_i$.

Figure 1:
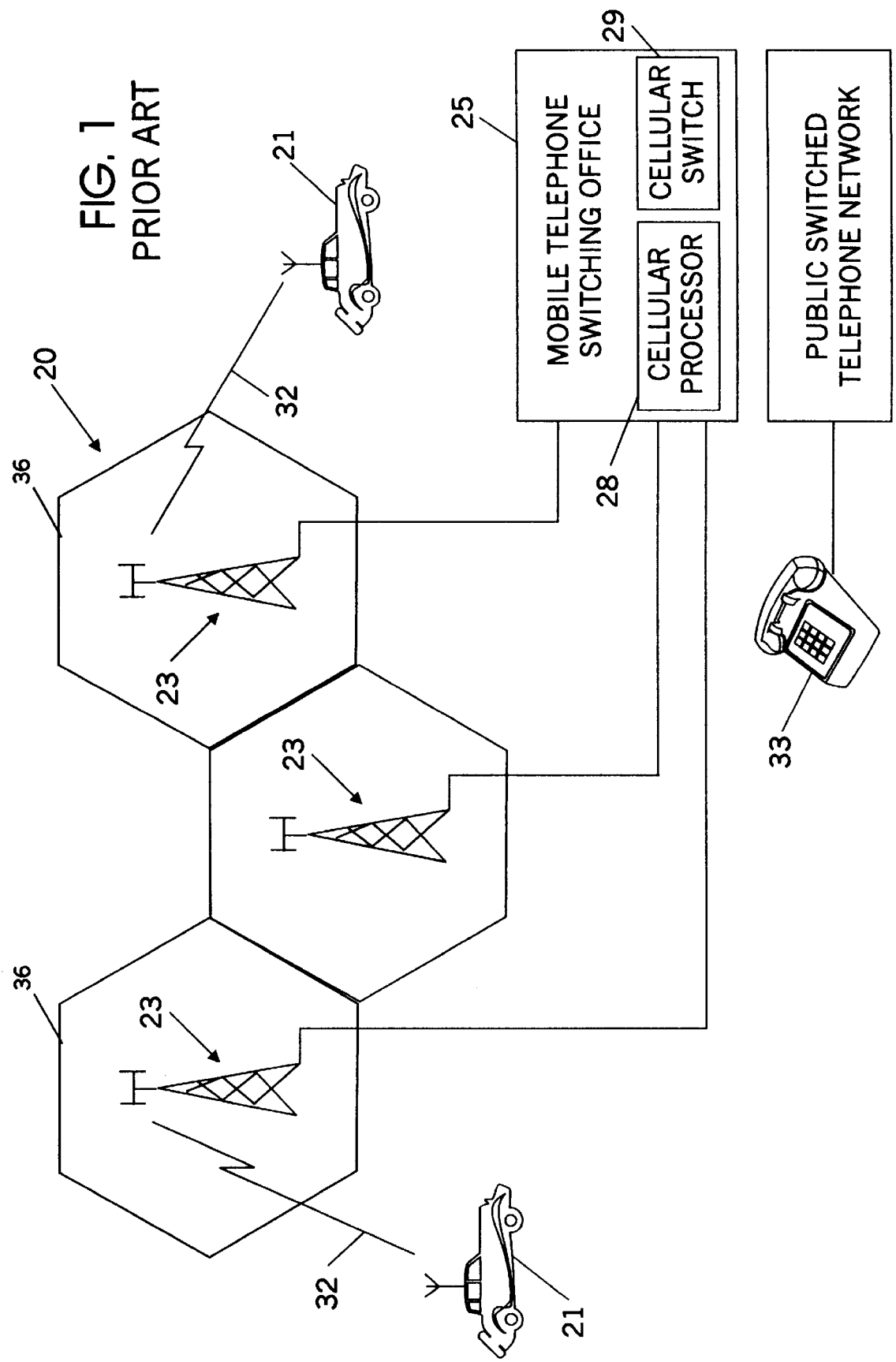
FIG. 1 is a schematic block diagram illustrating components of a cellular communications system according to the prior art.

In a two antenna transmission diversity system, the base station includes first and second encoders $E_1$ and $E_2$ operating according to respective generator matrices $G_1$ and $G_2$ as shown in FIG. 1. The information word $\underline{x}$ is mapped to two code words $\underline{y}_1$ and $\underline{y}_2$ as shown below:

$$\underline{y}_1 = \underline{x}G_1 = (y_{11}, \ldots y_{1n}),$$

and $$\underline{y}_2 = \underline{x}G_2 = (y_{21}, \ldots y_{2n}).$$

The code words $\underline{y}_1$ and $\underline{y}_2$ are then transmitted on respective first and second antennas A1 and A2.

The transmission paths P1 and P2 are assumed to follow a fading model wherein each code word is hit by a constant Rayleigh fade and wherein fades are independent from code word to code word and across antennas. The received vector is thus:

$$Z = \alpha_1 Y_1 + \alpha_2 Y_2 + v,$$

where $v$ is a gaussian noise vector. It is also assumed that $\alpha_1$ and $\alpha_2$ are known at the receiver. In practice, $\alpha_1$ and $\alpha_2$ can be can be estimated from orthogonal synchronization (training) sequences attached to $Y_1$ and $Y_2$.

The maximum likelihood decoding rule is to find the pair $(\underline{y}_1, \underline{y}_2)$ corresponding to some information word $\underline{x}$ that reduces the norm of the error vector:

$$E = Z - \hat{Z},$$

Where $\hat{Z}$ is the synthesized received vector given by:

$$\hat{Z} = \alpha_1 \hat{Y}_1 + \alpha_2 \hat{Y}_2.$$

The error vector can thus be written as:

$$E = \alpha_1(Y_1 - \hat{Y}_1) + \alpha_2(Y_2 - \hat{Y}_2) + v = 2\alpha_1(\hat{y}_1 - y_1) + 2\alpha_2(\hat{y}_2 - y_2) + v.$$

Because the code is linear, the case will be considered where $\underline{x}=\underline{0}$ is transmitted with corresponding code words $\underline{y}_1=\underline{0}$ and $\underline{y}_2=\underline{0}$, or equivalently $Y_1=+\underline{1}$ and $Y_2=+\underline{1}$. The resulting error vector becomes:

$$E = (\alpha_1+\alpha_2)\underline{1} - \alpha_1\hat{Y}_1 - \alpha_2\hat{Y}_2 + v = 2\alpha_1\hat{y}_1 + 2\alpha_2\hat{y}_2 + v,$$

where $\underline{0}$ is a vector of zeros, and $\underline{1}$ is a vector of ones. For notational simplicity, the noise vector $v$ will be dropped from the equation for E. In addition, u will denote the number of indices i where $\hat{y}_{1i}=1$ and $\hat{y}_{2i}=1$; $v_1$ will denote the number of indices i where $\hat{y}_{1i}=1$ and $\hat{y}_{2i}=0$; and $v_2$ will denote the number of indices i where $\hat{y}_{1i}=0$ and $\hat{y}_{2i}=1$. Accordingly, $(v_2+v_2)$ is the number of places where $\hat{y}_{1i} \neq \hat{y}_{2i}$. It follows that:

$$w(\hat{y}_1) = u + v_1 \geq d, \text{ if } \hat{y}_1 \neq 0 \quad (2)$$

$$w(\hat{y}_2) = u + v_2 \geq d, \text{ if } \hat{y}_2 \neq 0 \quad (3)$$

$$w(\hat{y}_1 + \hat{y}_2) = v_1 + v_2 \geq d, \text{ if } \hat{y}_1 + \hat{y}_2 \neq 0 \quad (4)$$

The squared norm $\epsilon$ of E can now be written as:

$$\epsilon = ||E||^2 = 4(u|\alpha_1+\alpha_2|^2 + v_1|\alpha_1|^2 + v_2|\alpha_2|^2). \quad (5)$$

The expansion (5) of $\epsilon$ can be used to derive some properties of u, $v_1$, and $v_2$, depending on the relation between $G_1$ and $G_2$.

In the event that an error occurs, $x \neq 0$. As a baseline, repeat diversity will be considered wherein $G_1 = G_2$. Accordingly, $$\hat{y}_1 = \hat{y}_2, \quad v_1 = v_2 = 0. \quad (6)$$

Furthermore, $$\epsilon = 4u|\alpha_1 + \alpha_2|^2 \quad (7)$$

$$\geq 4u|\alpha_1 + \alpha_2|^2 \text{ if } x \neq 0,$$

where the inequality follows from equation (2). Note that under the channel model assumptions, repeat diversity is equivalent to a transmitter with no diversity. It is thus a degenerate case of transmit diversity where the diversity advantage is not used.

The generator matrices $G_1$ and $G_2$ used in the encoders should exhibit the scrambling property discussed above to provide the full advantages of transmit diversity. As previously discussed, $G_1$ and $G_2$ can be related using a precoder F such that:

$$G_2 = FG_1.$$

Because useful generator matrices $G_1$ and $G_2$ are non-singular, F is also non-singular. The precoder F thus has the scrambling property if it satisfies:

$xF \neq x$ if $x \neq 0$, or equivalently if:

$y_1 \neq y_2$ if $x \neq 0$.

On the decoder side, this property provides that:

$\hat{y}_1 \neq \hat{y}_2$ if $x \neq 0$, and it follows from equation (4) that:

$$v_1 + v_2 > d \text{ if } x \neq 0. \tag{8}$$

The relationship of equation (8) provides a foundation for scrambling diversity.

The fading channel $(\alpha_1, \alpha_2)$ will now be discussed for three cases of interest for code performance analysis. Actual performance will depend on the statistics of $(\alpha_1, \alpha_2)$ and v. Case 1 occurs when $\alpha_1=+1$, and $\alpha_2=+1$. In this case, for scrambling diversity:

$$\epsilon = 4(4u+v_1+v_2) \geq 4(u+v_1+u+v_2) \geq 8d, \tag{9}$$

where the last inequality follows from equations (2) and (3), and for repeat diversity $$\epsilon = 16u \geq 16d, \tag{10}$$

where the inequality follows from equation (7).

Case 2 occurs when $\alpha_1=+1$, and $\alpha_2=0$. In this case, for scrambling diversity:

$$\epsilon = 4(4u+v_1) \geq 4d, \tag{11}$$

where the last inequality follows from equation (2), and for repeat diversity $$\epsilon = 4u \geq 4d, \tag{12}$$

where the inequality follows from equation (7). The case where $\alpha_1=0$ and $\alpha_2=+1$ is similar to the above case and need not be considered separately.

Case 3 occurs when $\alpha_1=+1$, and $\alpha_2=-1$. In this case, for scrambling diversity:

$$\epsilon = 4(v_1+v_2) \geq 4d, \tag{13}$$

where the last inequality follows from equation (4), and for repeat diversity $$\epsilon = 0, \tag{14}$$

where the inequality follows from equation (6). The case when $\alpha_1=-1$ and $\alpha_2=+1$ is similar and need not be considered separately.

As the average performance of a code tends to be dominated by the worst case, scrambling diversity should provide improved performance because its worst case is not 0. The worst case for repeat diversity, however, can be 0. In other words, scrambling diversity provides that the code word pair does not collapse (include the same two code words) as occurs with the repeat diversity situation of Case 3. Simulations confirm this result.

The 2-antenna transmit diversity system discussed above has been simulated and the results are illustrated in the graphs of FIGS. 3–8. In particular, the data in each graph corresponding to a two antenna scrambled diversity system of the present invention is indicated by the reference 2TXS. Data corresponding to a base line repeat diversity (no diversity) system is indicated by the reference 2TXR, and data corresponding to a two antenna receive diversity system is indicated by the reference 2RX for comparison. The data was obtained using the following codes: (7, 4; 3), (15, 5; 7), (15, 7; 5), (15, 11; 3), and (24, 12; 8). In addition, data was obtained for an uncoded 8 bit transmission (8, 8; 1).

The bit error rate (BER) and the frame or block error rate (FER) were measured, and the results are plotted in the graphs of FIGS. 3–8. The results are summarized in Table 1 which shows the gains of 2TXS over 2TXR, and the loss of 2TXS with respect to 2RX at 1% BER. For example, for a (15, 5; 7) code, 2TXS is 6.4 dB better than 2TXR, and 3 dB worse than 2RX. In general, the FER results show the same trend and favor 2TXS in the sense that it approaches 2RX. The simulation results thus confirm the advantages of the scrambling diversity of the present invention. Table 1 summarizes the gain $\gamma$(dB) of transmit diversity over no diversity and the loss $\lambda$(dB) of transmit diversity with respect to receive diversity, a 1% BER.

TABLE 1

| code | $\gamma$ | $\lambda$ |
|---|---|---|
| (8.8;1) | 4.8 | 3.4 |
| (7, 4;3) | 5.9 | 3.9 |
| (15, 5;7) | 6.4 | 2.9 |
| (15, 7;5) | 5.6 | 3.5 |
| (15, 11;3) | 5.7 | 2.8 |
| (24, 12;8) | 7.3 | 3.0 |

The use of transmission diversity methods, systems, and terminals according to the present invention can be used with the D-AMPS+cellular communications protocol which is a higher throughput extension of the D-AMPS cellular communications protocol. The transmission diversity techniques of the present invention can also be used with other cellular communications protocols as well as non-cellular radio communications systems.

Although the encoding of the present invention has been discussed in terms of a generator matrix representing a linear encoder, scrambling diversity according to the present invention can also be used with other encoders such as non-linear encoders. For example, if $g_1(x)=y_1$ represents a first generally non-linear encoder, then a scrambling matrix F can be used to obtain a second encoder $g_2(x)=g_1(xF)=y_2$.

While diversity transmission has been discussed above with respect to binary block codes, diversity transmission according to the present invention can also be applied to other codes. For example, scrambling diversity transmission can be applied to binary convolution codes; non-binary block codes such as Reed-Solomon codes and BCH codes for the Lee metric; and non-binary trellis codes such as trellis coded modulation and dual-K codes.

Many modifications and other embodiments of the invention will come to the mind of one skilled in the art having the benefit of the teachings presented in the foregoing descriptions and the associated drawings. Therefore, it is to be understood that the invention is not limited to the specific embodiments disclosed, and that modifications and embodiments are intended to be included within the scope of the appended claims.

That which is claimed is:

1. A method of transmitting information comprising the steps of:

mapping a common information word to a first code word using a first mapping function, wherein said common information word is selected from a set of information words, and wherein said first code word is selected from a common set of code words;

mapping said common information word to a second code word using a second mapping function, wherein said second code word is selected from said common code word set, and wherein said first and second mapping functions are defined such that each of said information words of said information word set are mapped to two different code words of said common code word set; and transmitting said first and second code words.

2. A method according to claim 1 wherein each of said information words in said information word set has a first predetermined length and wherein each of said code words in said code word set has a second predetermined length greater than said first predetermined length.

3. A method according to claim 1 wherein said transmitting step comprises transmitting said first code word from a first antenna and transmitting said second code word from a second antenna.

4. A method according to claim 1 wherein said first and second code words are transmitted concurrently.

5. A method according to claim 4 wherein said first and second code words are transmitted over a common frequency.

6. A method according to claim 1 wherein said first mapping function comprises a first generator matrix such that said first code word is equal to said first generator matrix times said information word, and wherein said second mapping function comprises a second generator matrix so that said second code word is equal to said second generator matrix times said information word.

7. A method according to claim 6 wherein said first and second generator matrices are related by a precoder such that the first generator matrix is equal to the precoder times the second generator matrix.

8. A method according to claim 7 wherein said precoder is constructed from the outputs of a linear m-sequence generator.

9. A method according to claim 1 further comprising the steps of:

receiving said first and second code words at a user terminal; and decoding said first and second code words at said user terminal to estimate said information word.

10. A method according to claim 1 wherein a number of information words in said information word set is equal to a number of code words in said code word set.

11. A method according to claim 1 further comprising the step of:

mapping said common information word to a third code word using a third mapping function, wherein said third code word is selected from said common code word set, and wherein said first, second, and third mapping functions are defined such that each of said information words of said information word set are mapped to three different code words of said common code word set, and wherein said transmitting step comprises transmitting said first, second, and third code words.

12. A method according to claim 1 wherein said first and second mapping functions comprise linear mapping functions.

13. A method according to claim 1 wherein said first and second mapping functions comprise non-linear mapping functions.

14. A diversity transmission system for transmitting information, said diversity transmission system comprising:

a first encoder which maps a common information word to a first code word using a first mapping function, wherein said common information word is selected from a set of information words, and wherein said first code word is selected from a common set of code words;

a second encoder which maps said common information word to a second code word using a second mapping function, wherein said second code word is selected from said common code word set, and wherein said first and second mapping functions are defined such that each of said information words of said information word set are mapped to two different code words of said common code word set; and a transmitter which transmits said first and second code words.

15. A diversity transmission system according to claim 14 wherein each of said information words in said information word set has a first predetermined length and wherein each of said code words in said code word set has a second predetermined length greater than said first predetermined length.

16. A diversity transmission system according to claim 14 further comprising first and second antennas coupled to said transmitter wherein said first code word is transmitted from said first antenna and wherein said second code word is transmitted from said second antenna.

17. A diversity transmission system according to claim 14 wherein said first and second code words are transmitted concurrently.

18. A diversity transmission system according to claim 17 wherein said first and second code words are transmitted over a common frequency.

19. A diversity transmission system according to claim 14 wherein said first mapping function comprises a first generator matrix such that said first code word is equal to said first generator matrix times said information word, and wherein said second mapping function comprises a second generator matrix so that said second code word is equal to said second generator matrix times said information word.

20. A diversity transmission system according to claim 19 wherein said first and second generator matrices are related by a precoder such that the first generator matrix is equal to the precoder times the second generator matrix.

21. A diversity transmission system according to claim 20 wherein said precoder is constructed from the outputs of a linear m-sequence generator.

22. A diversity transmission system according to claim 14 wherein a number of information words in said information word set is equal to a number of code words in said code word set.

23. A diversity transmission system according to claim 14 further comprising:

a third encoder which maps said common information word to a third code word using a third mapping function, wherein said third code word is selected from said common code word set, and wherein said first, second, and third mapping functions are defined such that each of said information words of said information word set are mapped to three different code words of said common code word set, and wherein said transmitter transmits said first, second, and third code words.

24. A diversity transmission system according to claim 14 wherein said first and second mapping functions comprise linear mapping functions.

25. A diversity transmission system according to claim 14 wherein said first and second mapping functions comprise non-linear mapping functions.

26. A method of receiving information wherein a common information word is selected from an information word set, wherein the common information word is mapped to first and second code words selected from a common code word set using respective first and second mapping functions, and wherein the first and second code words are transmitted, said method comprising the steps of:

receiving the first and second code words; and decoding the first and second code words to estimate the common information word, wherein said first and second mapping functions are defined such that each of said information words of said information word set are mapped to two different code words of said code word set.

27. A method according to claim 26 wherein the first and second code words are decoded concurrently.

28. A method according to claim 26 wherein a first synchronization sequence is transmitted with the first code word and a second synchronization sequence is transmitted with the second code word, and wherein the first and second code words are transmitted over first and second paths, said method comprising the steps of:

receiving the first and second synchronization sequences; and resolving fading of the first and second paths using the first and second synchronization sequences.

29. A method according to claim 26 wherein the first and second code words are transmitted concurrently, and wherein the first and second code words are received concurrently.

30. A method according to claim 29 wherein the first and second code words are transmitted over a common frequency.

31. A method according to claim 26 wherein the common information word is mapped to a third code word selected from the common code word set and wherein the third code word is transmitted, wherein:

said receiving step comprises receiving the first, second, and third code words; and said decoding step comprises decoding the first, second, and third code words to estimate the common information word.

32. A method according to claim 26 wherein each of the information words in the information word set has a first predetermined length and wherein each of the code words in the code word set has a second predetermined length greater than the first predetermined length.

33. A method according to claim 26 wherein the information word is mapped to the first and second code words using linear mapping functions.

34. A method according to claim 26 wherein the information word is mapped to the first and second code words using non-linear mapping functions.

35. A user terminal for receiving information wherein a common information word is selected from an information word set, wherein the common information word is mapped to first and second code words selected from a common code word set using respective first and second mapping functions, and wherein the first and second code words are transmitted, said method comprising the steps of:

a receiver which receives the first and second code words; and a processor coupled to said receiver wherein said processor decodes the first and second code words to estimate the common information word, wherein said first and second mapping functions are defined such that each of said information words of said information word set are mapped to two different code words of said code word set.

36. A user terminal according to claim 35 wherein the first and second code words are decoded concurrently.

37. A user terminal according to claim 35 wherein a first synchronization sequence is transmitted with the first code word and a second synchronization sequence is transmitted with the second code word, and wherein the first and second code words are transmitted over first and second paths, wherein:

said receiver receives the first and second synchronization sequences; and said processor resolves fading of the first and second paths using the first and second synchronization sequences.

38. A user terminal according to claim 35 wherein the first and second code words are transmitted concurrently, and wherein:

said receiver receives the first and second code words concurrently.

39. A user terminal according to claim 37 wherein the first and second code words are transmitted over a common frequency, and wherein:

said receiver receives the first and second code words over the common frequency.

40. A user terminal according to claim 35 wherein each of the information words in the information word set has a first predetermined length and wherein each of the code words in the code word set has a second predetermined length greater than the first predetermined length.

41. A user terminal according to claim 35 wherein the information word is mapped to the first and second code words using a linear mapping function.

42. A user terminal according to claim 35 wherein the information word is mapped to the first and second code words using a non-linear mapping function.

43. A method according to claim 1 wherein said first code word is transmitted with a first synchronization sequence and said second code word is transmitted with a synchronization sequence different than the first synchronization sequence.

44. A diversity transmission system according to claim 14 wherein said transmitter transmits said first code word with a first synchronization sequence and said second code word with a second synchronization sequence different than the first synchronization sequence.

45. A method according to claim 26 wherein said first mapping function comprises a first generator matrix such that said first code word is equal to said first generator matrix times said information word, wherein said second mapping function comprises a second generator matrix so that said second code word is equal to said second generator matrix times said information word, and wherein said first and second generator matrices are related by a precoder times the second generator matrix.

46. A method according to claim 45 wherein said precoder is constructed from the outputs of a linear m-sequence generator.

47. A user terminal according to claim 35 wherein said first mapping function comprises a first generator matrix such that said first code word is equal to said first generator matrix times said information word, wherein said second mapping function comprises a second generator matrix so that said second code word is equal to said second generator matrix times said information word, and wherein said first and second generator matrices are related by a precoder times the second generator matrix.

48. A user terminal according to claim 47 wherein said precoder is constructed from the outputs of a linear m-sequence generator.

49. A method according to claim 3 wherein said first code word is transmitted from the first antenna without transmitting said second code word from the first antenna, and wherein said second code word is transmitted from the second antenna without transmitting said first code word from the second antenna.

50. A diversity transmission system according to claim 16 wherein said first code word is transmitted from said first antenna without transmitting said second code word from said first antenna, and wherein said second code word is transmitted from said second antenna without transmitting said first code word from said second antenna.

\* \* \* \* \*